No. 718,111. PATENTED JAN. 13, 1903.
S. S. EVELAND.
ANTIFRICTION END THRUST DEVICE.
APPLICATION FILED NOV. 30, 1901.
NO MODEL.
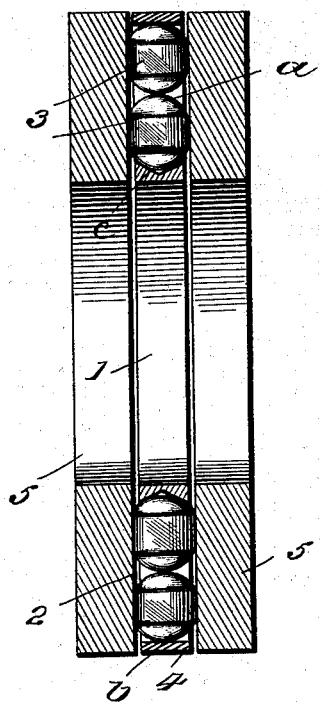
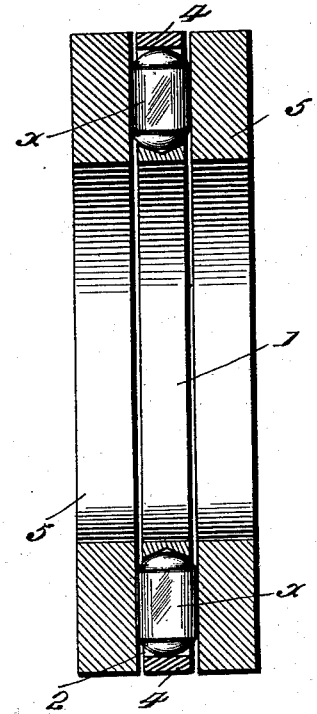
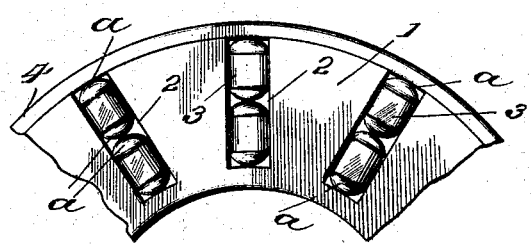
Inventor
Samuel S. Eveland.
By Augustus B. Stoughton
Attorney

UNITED STATES PATENT OFFICE.

SAMUEL S. EVELAND, OF PHILADELPHIA, PENNSYLVANIA.

ANTIFRICTION END-THRUST DEVICE.

SPECIFICATION forming part of Letters Patent No. 718,111, dated January 13, 1903.

Application filed November 30, 1901. Serial No. 84,223. (No model.)

*To all whom it may concern:*

Be it known that I, SAMUEL S. EVELAND, a citizen of the United States, residing at Philadelphia, in the county of Philadelphia and State of Pennsylvania, have invented a certain new and useful Antifriction End-Thrust Device, of which the following is a specification.

The object is to provide a roller thrust-bearing which shall be simple in construction and efficient in operation and the rollers of which will be universally applicable to all sizes of thrust-bearings using balls or rollers, whereby the cost of production and maintenance is considerably reduced.

To the end stated the invention consists in the improvements hereinafter stated.

The nature, characteristic features, and scope of the invention will be more clearly understood by reference to the following description, taken in connection with the accompanying drawings, forming a part hereof, and in which—

Figure 1 is a sectional view of an end-thrust device embodying features of the invention. Fig. 2 is a similar view of a modification, and Fig. 3 is an elevational view in detail of the construction shown in Fig. 1.

Having reference to the drawings, 1 is a plate or disk provided with radial open slots or sockets 2, which open outwardly for the reception of rollers.

3 represents the rollers, which are cylindrical and provided at their ends with spherical parts $a$, so that friction of the parts is reduced to the minimum possible.

4 is a band or ring having a running fit on the periphery of the disk 1 and operating to retain the rollers in the sockets.

5 represents hardened disks or washers mounted, respectively, one at each side of the disk 1.

The radial slots or sockets 2 are open at their sides, so that the cylindrical faces of the rollers protrude therefrom and have rolling contact with the hardened faces of the disks or plates 5.

The band 4 may be provided with a groove $b$ and the plate or disk 1 with corresponding concavities $c$ to accommodate the spherical ends of the rollers.

In the modification, Fig. 2, the radial sockets are provided with single rollers $x$ in lieu of the pair of short rollers shown in Fig. 1. In both constructions it will be observed that the cylindrical rollers not only serve to take up longitudinal or horizontal thrust by reason of their cylindrical faces, but also take up radial thrust or pressure by reason of their spherical bearing-faces.

It will be obvious to those skilled in the art to which the invention appertains that modifications may be made in details without departing from the spirit and scope of the same. Hence I do not limit myself to the precise construction and arrangement of parts hereinabove described, and illustrated in the accompanying drawings; but, Having described the nature and objects of the invention, what I claim as new, and desire to secure by Letters Patent, is—

1. A bearing comprising a ring formed with a series of sockets extending from the outer edge or periphery of the ring inwardly and which are open at their sides, cylindrical rollers arranged in said sockets and protruding at the sides thereof and having spherical ends, and a ring having a running fit on the periphery of said first-mentioned ring and serving to confine the rollers, substantially as described.

2. A bearing comprising a ring formed with a series of sockets extending from the outer edge or periphery of the ring inwardly and which are open at their sides, a plural number of cylindrical rollers arranged in each of said sockets and protruding at the sides thereof, each of said rollers having spherical ends, and a ring fitted to the periphery of said first-mentioned ring and acting to confine the rollers, substantially as described.

3. A bearing comprising a ring formed with a series of sockets extending from the outer edge or periphery of the ring inwardly and which are open at their sides and have concavities in their bottoms, a plural number of cylindrical rollers with spherical ends arranged in each of said sockets and having their cylindrical faces protruding at the sides thereof, and a ring fitted to the periphery of said first-mentioned ring and acting to confine the rollers, substantially as described.

4. A bearing comprising a ring formed with a series of sockets extending from the outer edge or periphery of the ring inwardly and which are open at their sides, cylindrical rollers arranged in said sockets with their axes disposed lengthwise of the sockets and with their cylindrical faces protruding from the sides of the sockets, and a ring loosely fitted to the periphery of said first-mentioned ring and acting to confine the rollers, substantially as described.

5. A bearing comprising a cage or ring formed with a series of sockets extending from the outer edge or periphery of the ring inwardly and which are open at their sides and have concavities in their bottoms, cylindrical rollers with spherical ends arranged in said sockets and having their axes disposed lengthwise of the sockets and their cylindrical faces protruding from the sides thereof, coaxial rings or washers against which the cylindrical faces of the rollers are afforded rolling contact, and a ring fitted to the periphery of the cage and acting to confine the rollers, substantially as described.

In testimony whereof I have hereunto signed my name in the presence of two subscribing witnesses.

SAMUEL S. EVELAND.

Witnesses:
W. J. JACKSON,
JAS. A. RICHMOND.